United States Patent Office 3,218,167

Patented Nov. 16, 1965

3,218,167

PHOTOPOLYMERIZABLE ELEMENTS CONTAINING LIGHT STABLE COLORING MATERIALS

Marion Burg, Metuchen, and Abraham Bernard Cohen, Springfield, N.J., assignors to E. I. du Pont de Nemours and Company, Wilmington, Del., a corporation of Delaware No Drawing. Filed Dec. 29, 1961, Ser. No. 163,078
15 Claims. (Cl. 96—85)

This application is a continuation-in-part of copending patent application Ser. No. 831,700, filed August 5, 1959, now U.S. Patent 3,060,023 issued October 23, 1962.

This invention relates to photosensitive elements, and more particularly to photopolymerizable elements suitable for forming images on a wide variety of common receptor surfaces.

Various processes for producing copies of an original image by transmission or reflex exposure of a photosensitive surface followed by transfer of an image to special receptor sheets are known. Thus, it has been proposed to accomplish the transfer of gelatin-silver halide layers thermally by using a wet image. Although other thermal processes are known, to the best of applicant's knowledge, no practical process has been proposed for the dry thermal transfer of images from photopolymerized image-bearing elements to commonly used receptors such as untreated writing, typing and printing papers.

An object of this invention is to provide new and practical photosensitive elements. Another object is to provide such elements that are simple and dependable. A further object is to provide such elements that can be used in thermal image transfer processes and which utilize simple and economical apparatus. A further object is to provide such elements that can be used to form images on inexpensive receptor sheets, e.g., paper. Still further objects will be apparent from the following description.

The photopolymerizable elements of this invention comprise a thermoplastic photopolymerizable stratum on a suitable support, said stratum being solid below 40° C., thermally transferable by having a stick or transfer temperature above 18° C. and below 220° C. and comprising (a) an ethylenically unsaturated compound containing at least one terminal ethylenic group ($CH_2{=}C{<}$), having a boiling point above 100° C. at normal atmospheric pressure and being capable of forming a high polymer by photoinitiated addition polymerization, (b) a free-radical generating addition polymerization initiator activatable by actinic light in the visible region of the spectrum, i.e., from 350 to 700 mu and inactive thermally below 85° C. in an amount from 0.001 to 10% or more by weight of the total other components and (c) a coloring material, preferably a dye, which absorbs radiation in part of the visible region of the spectrum but does not absorb appreciable actinic radiation in a spectral region where said initiator is activatable. Preferably, there is a coincidence of an actinic region of the initiator and a distinct absorption minimum of the dye in the region of 350 to 500 mu. In a particularly preferred embodiment, the dye should impart to the element an optical density of at least 0.5 at a wavelength in the visible spectrum and an optical density less than 0.3 in a spectral region which is actinic for the initiator. The dye should not inhibit polymerization and the photopolymerizable stratum preferably has a thickness of 0.01 to 1 mil.

Optionally, the composition may contain (d) at least one viscosity-modifying agent, e.g., a thermoplastic organic compound solid at 50° C., one or more of which agents may contain at least one terminal ethylenic group or which may be saturated, i.e., free from such a group, and/or (e) an addition polymerization inhibitor in inhibition-effective amounts, e.g., an amount from 0.001% to 2.0% or more by weight of the other components, and/or (f) a chain transfer agent including one or more of the chain transfer agents disclosed in Barney et al., Canadian Patent No. 632,188, Dec. 5, 1961, in the amounts given in that patent, especially a polyethylene oxide of a molecular weight of about 500 to about 20,000. Components (d) and (a), when different, are present in amounts from 3 to 97 and 97 to 3 parts by weight, respectively. Component (a) preferably has a plasticizing action on component (d).

The thermal transfer process of application Ser. No. 831,700 filed Aug. 5, 1959 (U.S.P. 3,060,023), comprises placing the surface of the imagewise exposed photopolymerizable stratum into contact with the image-receptive surface of a separate element, applying heat so that the temperature at the interface of said contacting elements reaches a temperature of at least 40° C., and separating the two elements whereby the thermally transferable underexposed image areas of said stratum transfers to or forms on the surface of said image-receptive support.

The term "underexposed" as used herein and in our parent application is intended to cover the image areas which are completely unexposed or partially exposed so that there is a material amount of the addition polymerizable compound still present and insufficient addition polymer image has been formed to firmly bind the constituents in a non-transferable form and so that there is polymerizable compound still present in sufficient quantity that the softening temperature in the underexposed areas remains substantially lower than that of the complementary, adjoining coplanar exposed image areas.

The exposed areas are non-thermally transferable at the transfer temperature at which the underexposed areas are transferable. The term "transfer temperature" means the minimum temperature at which the image areas in question stick or adhere, within 10 seconds, under slight pressure, e.g., thumb pressure, to analytical filter paper (Schleicher and Schuell analytical filter paper No. 595).

Thermoplastic image-bearing elements can be made by exposing to actinic light, imagewise, a layer having the constitution defined above (i.e., for the thermally transferable image areas of the stratum) until substantial addition polymerization takes place in the exposed areas to form an addition polymer and significantly less polymerization takes place in the underexposed areas to provide a difference in stick temperature of at least 10° C. between said exposed and underexposed areas. The exposure can be through a stencil, line or halftone negative or positive, a cutout stencil or a continuous tone transparency adjacent to or in contact with the layer. Reflectrographic or projection exposure can be made.

While the addition polymerizable component present in the underexposed areas of the photopolymerizable element can be a monomeric ethylenically unsaturated compound capable of polymerizing or forming a high polymer in a short time, e.g., 0.5–10 seconds, by photoinitiated polymerization as disclosed in Plambeck U.S. 2,760,863, the particularly useful compounds fall within a general class, namely, normally nongaseous (i.e., at 20° C. and atmospheric pressure) ethylenically unsaturated monomeric compounds having at least one terminal ethylenic group, preferably two or more, a normal boiling point above 100° C., and a plasticizing action on the thermoplastic polymer.

In practicing the invention, a photopolymerizable element containing an image-yielding stratum of the above components is exposed to actinic radiation through a photographic process transparency, e.g., a photographic positive, negative, two-tone or halftone, a light-transmitting paper, or to an image or printed matter on an opaque support by means of reflex exposure, and is intimately brought into contact under pressure with a receptor support, e.g., paper, metal, synthetic polymer, screen, etc., during which time the element is heated in the range of 40° to 220° C. or more, and while still warm the surfaces are separated. The thermoplastic photopolymerizable composition is transferred to the paper, metal, etc., support in the areas corresponding to the unexposed, or least exposed, areas to give at least one duplicate copy of the original positive, negative or original image. Multiple copies can be obtained by repeating the heat transfer procedure using appropriate coating thicknesses of the photosensitive layer, pressures and temperatures to give the desired number of copies, using a new receptor each time.

The process of our parent application is quite versatile and polymerizable compositions disclosed in Plambeck U.S. Patent 2,760,863 can be used to prepare the element with the photopolymerized image. Relief images ranging in depth from a fraction of a mil, e.g., 0.001 to 1 mil up to 10 mils or more, can be formed by the instant process, but unlike the processes described in the Plambeck patent, a relief image is formed by thermal transfer of the unexposed areas of the photopolymerizable stratum and not by the solvent washout of said unexposed areas.

Suitable thermoplastic polymers for use as components (d) include:

(A) Copolyesters, e.g., those prepared from the reaction product of a polymethylene glycol of the formula $HO(CH_2)_nOH$, wherein n is a whole number 2 to 10 inclusive, and (1) hexahydroterephthalic, sebacic and terephthalic acids, (2) terephthalic, isophthalic and sebacic acids, (3) terephthalic and sebacic acids, (4) terephthalic and isophthalic acids, and (5) mixtures of copolyesters prepared from said glycols and (i) terephthalic, isophthalic and sebacic acids and (ii) terephthalic, isophthalic, sebacic and adipic acids.

(B) Nylons or polyamides, e.g., N-methoxymethyl polyhexamethylene adipamide;

(C) Vinylidene chloride copolymers, e.g., vinylidene chloride/acrylonitrile; vinylidene chloride/methylacrylate and vinylidene chloride/vinylacetate copolymers;

(D) Ethylene/vinyl acetate copolymers;

(E) Cellulosic ethers, e.g., methyl cellulose, ethyl cellulose and benzyl cellulose;

(F) Polyethylenes;

(G) Synthetic rubbers, e.g., butadiene/acrylonitrile copolymers, and chloro-2-butadiene-1,3-polymers;

(H) Cellulose esters, e.g., cellulose acetate, cellulose acetate succinate, cellulose acetate butyrate, cellulose acetate acrylate and cellulose acrylate;

(I) Polyvinyl esters, e.g., polyvinyl acetate/acrylate, polyvinyl acetate/methacrylate and polyvinyl acetate;

(J) Polyacrylate and alpha-alkyl polyacrylate esters, e.g., polymethyl methacrylate and polyethyl methacrylate;

(K) High molecular weight polyethylene oxides or polypropylene oxides having average molecular weights from about 4,000 to 1,000,000;

(L) Polyvinyl chloride and copolymers, e.g., polyvinyl chloride/acetate;

(M) Polyvinyl acetal, e.g., polyvinyl butyral, polyvinyl formal;

(N) Polyformaldehydes;

(O) Polyurethanes;

(P) Polycarbonates;

(Q) Polystyrenes;

(R) Extralinear unsaturated polyamides, e.g., N-acrylyloxymethyl and N-methacrylyloxymethyl polyamides.

When the photopolymerizable stratum comprises polymeric/monomeric compositions as are described below, plasticizing agents such as low molecular weight polyalkylene oxides, ethers and esters, e.g., triethylene glycol dicaprylate, polypropylene glycol mono-n-butyl ether; and other esters such as phthalates, e.g., dibutyl phthalate; adipates, e.g., diisobutyl adipate; sebacates, e.g., dimethyl sebacate, can be used. In addition, phosphates, e.g., tricresyl phosphate; amides and sulfonamides, e.g., N-ethyl-p-toluenesulfonamide; carbonates, e.g., bis(dimethylbenzyl)carbonate; citrates, e.g., triethyl citrate; glycerol esters, e.g., glycerol triacetate; laurates, e.g., n-butyl laurate; oleates, stearates, etc.; and sucrose octacetate are also useful.

In addition to the thermoplastic polymer constituent of the photopolymerizable composition there can be added non-thermoplastic polymeric compounds to give certain desirable characteristics, e.g., to improve adhesion to the base support, adhesion to the receptor support on transfer, wear properties, chemical inertness, etc. Suitable non-thermoplastic polymeric compounds include polyvinyl alcohol, cellulose, anhydrous gelatin, phenolic resins and melamine-formaldehyde resins, etc. If desired, the photopolymerizable layers can also contain immiscible polymeric or non-polymeric organic or inorganic fillers or reinforcing agents which are essentially transparent at the wavelengths used for the exposure of the photopolymeric material, e.g., the organophilic silicas, bentonites, silica, powdered glass, colloidal silver, in amounts varying with the desired properties of the photopolymerizable layer. The fillers are useful in improving the strength of the composition and in reducing tack.

Suitable addition polymerizable ethylenically unsaturated compounds for use as components (a) which can be used with the above-described thermoplastic polymer compounds include unsaturated esters of polyols, particularly such esters as the alpha-methylene carboxylic acids, e.g., ethylene diacrylate, diethylene glycol diacrylate, glycerol diacrylate, glycerol triacrylate, mannitol polyacrylate, sorbitol polyacrylates, ethylene dimethacrylate, 1,3-propanediol dimethacrylate 1,2,4-butanetriol trimethacrylate, 1,4-cyclohexanediol diacrylate, 1,4-benzenediol dimethacrylate, pentaerythritol di-, tri- and tetramethacrylate, dipentaerythritol polyacrylate, pentaerythritol di-, tri-, and tetraacrylates, 1,3-propanediol diacrylate, 1,5-pentanediol dimethacrylate, the bis-acrylates and methacrylates of polyethylene glycols of molecular weight 200–4000, and the like; unsaturated amides, particularly those of the alpha-methylene carboxylic acids, and especially those of alpha, omega-diamines and oxygen-interrupted omega-diamines, such as methylene bis-acrylamide, methylene bis-methacrylamide, ethylene bis-methacrylamide, 1,6-hexamethylene bis-acrylamide, diethylene triamine tris-methacrylamide, bis(gamma-methacrylamidopropoxy)ethane, beta-methacrylamidoethyl methacrylate, N-(beta-hydroxyethyl)-beta-(metacrylamido)ethyl acrylate and N,N-bis(beta-methacrylyloxyethyl)acrylamide; vinyl esters such as divinyl succinate, divinyl adipate, divinyl phthalate, divinyl terephthalate, divinyl benzene-1,3-disulfonate, and divinyl butane-1,4-disulfonate; and unsaturated aldehydes, such as sorbaldehyde (hexadienal). An outstanding class of these preferred addition polymerizable components are the esters and amides of alpha-methylene carboxylic acids and substituted carboxylic acids with polyols and polyamines wherein the molecular chain between the hydroxyls and amino groups is solely carbon or oxygen-interrupted carbon. The preferred monomeric compounds are polyfunctional, but monofunctional monomers can also be used. The amount of monomer added varies with the particular thermoplastic polymer used.

The ethylenic unsaturation can be present as an extralinear substituent attached to a thermoplastic linear polymer, such as polyvinyl acetate/acrylate, cellulose acetate/acrylate, cellulose acetate/methacrylate, N-acrylyloxmethylpolyamide, N-methacrylyloxymethylpolyamide, allyloxymethylpolyamide, etc., in which case the monomer and polymer functions are combined in a single material.

A preferred class of addition polymerization initiators (b) activatable by actinic light and thermally inactive at and below 185° C. includes the substituted or unsubstituted polynuclear quinones which are compounds having two intracyclic carbonyl groups attached to intracyclic carbon atoms in a conjugated six-membered carbocyclic ring, there being at least one aromatic carbocyclic ring fused to the ring containing the carbonyl groups. Suitable such initiators include 9,10-anthraquinone, 1-chloroanthraquinone, 2-chloroanthraquinone, 2-methylanthraquinone, 2-tert-butylanthraquinone, octamethylanthraquinone, 1,4-naphthoquinone, 9,10-phenathrenequinone, 1,2-benzanthraquinone, 2,3-benzanthraquinone, 2-methyl-1,4-naphthoquinone, 2,3-dichloronaphthoquinone, 1,4-dimethylanthraquinone, 2,3-dimethylanthraquinone, 2-phenylanthraquinone, 2,3-diphenylanthraquinone, sodium salt of anthraquinone alpha-sulfonic acid, 3-chloro-2-methylanthraquinone, retenequinone, 7,8,9,10-tetrahydronaphthacenequinone, and 1,2,3,4-tetrahydrobenz[a]anthracene-7,12-dione. Other photoinitiators which are also useful are described in Plambeck U.S. Patent 2,760,863 and include vicinal ketaldonyl compounds, such as diacetyl, benzil, etc.; alpha-ketaldonyl alcohols, such as benzoin, pivaloin, etc., acyloin ethers, e.g., benzoin methyl and ethyl ethers, etc.; alpha-hydrocarbon substituted aromatic acyloins, including alpha-methyl-benzoin, alpha-allyl-benzoin, and alpha-phenylbenzoin.

Suitable thermal polymerization inhibitors (e) that can be used in addition to the preferred p-methoxyphenol include hydroquinones and alkyl and aryl-substituted hydroquinones and quinones, tert-butylcatechol, pyrogallol, copper resinate, naphthylamines, beta-naphthol, cuprous chloride, 2,6-di-tert-butyl-p-cresol, phenothiazine, pyridine, nitrobenzene and dinitrobenzene. Other useful inhibitors include p-toluquinone and chloranil.

The following dyes are useful as component (c) in the elements of this invention: Methylene Violet (CI Basic Violet 5), "Luxol" Fast Blue MBSN (CI Solvent Blue 38), "Pontacyl" Wool Blue BL (CI Acid Blue 59 or CI 50315), "Pontacyl" Wool Blue GL (CI Acid Blue 102 or CI 50320), Victoria Pure Blue BO (CI Basic Blue 7 or CI 42595), Rhodamine 3 GO (CI Basic Red 4), Rhodamine 6 GDN (CI Basic Red 1 or CI 45160), 1,1'-diethyl-2,2'-cyanine iodide, Fuchsine dye (CI 42510), Calcocid Green S (CI 44090) and Anthraquinone Blue 2 GA (CI Acid Blue 58).

Useful thermographic additives, e.g., 3 cyano-4,5-dimethyl-5-hydroxy-3-pyrrolin-2-one, and activators, e.g., copper acetate, are disclosed in the application of Holland and Wayrynen Ser. No. 807,761 filed April 21, 1959, and the following U.S. Patents: 2,625,494, 2,637,657, 2,663,-654, 2,663,655, 2,663,656 and 2,663,657.

Suitable color-forming components which form colored compounds on the application of heat or when brought in contact with other color forming components on a separate support, include:

(1) Organic and inorganic components: dimethyl glyoxime and nickel salts; phenolyphthalein and sodium hydroxide; starch/postassium iodide and oxidizing agent, i.e., peroxides; phenols and iron salts; thioacetamide and lead acetate; silver salt and reducing agent, e.g., hydroquinone.

(2) Inorganic components: ferric salts and potassium thiocyanate; ferrous salts and potassium ferricyanide; copper, mercury or silver salts and sulfide ions; lead acetate and sodium sulfide.

(3) Organic components: 2,4-dinitrophenylhydrazine and aldehydes or ketones; diazonium salt and phenol or naphthol, e.g., benzenediazonium chloride and beta-naphthol; substituted aromatic aldehydes or amines and a color photographic developing compound, e.g., p-dimethylaminobenzaldehyde and p-diethylaminoaniline; color photographic developing compound/active methylene compound and an oxidizing agent, e.g., p-diethylaminotoluidine/alpha-cyanoacetophenone and potassium persulfate.

The photopolymerizable composition is preferably coated on a base support. Suitable support materials are stable at the heating temperatures used in the instant invention. Suitable bases or supports include those disclosed in U.S. Patent 2,760,863, glass, wood, paper, cloth, cellulose esters, e.g., cellulose acetate, cellulose propionate, cellulose butyrate, etc., and other plastic compositions, etc. The support may have in or on its surface and beneath the photopolymerizable stratum an antihalation layer as disclosed in said patent or other substrata needed to facilitate anchorage to the base.

The receptor support to which the image is transferred must also be stable at the process temperatures. The particular support used is dependent on the desired use for the transferred image and on the adhesion of the image to the base. Suitable supports include paper including bond paper, resin and clay sized paper, resin coated or impregnated paper, cardboard, metal sheets, foils and meshes, e.g., aluminum, copper, steel, bronze, etc.; wood, glass, nylon, rubber, polyethylene, linear condensation polymers such as the polyesters e.g., polyethylene terephthalate, regenerated cellulose, cellulose esters, e.g., cellulose acetate, silk, cotton, and viscose rayon fabrics or screens.

The receptive support may have a hydrophilic surface or may contain on its surface chemical compounds which react with compounds being transferred so as to produce differences in color, hydrophilicity or conductivity between the receptor and the transferred underexposed areas or for improved adhesion or brightening of the receptive support. The receptor surface may be smooth, contain roughening agents such as silica, be perforated or be in the form of a mesh or screen.

The layer is exposed to actinic radiation prior to the transfer of a portion of the photopolymerizable layer (in underexposed areas). This may be through a continuous tone transparency or may be through a process negative or positive (an image-bearing transparency consisting solely of substantially opaque and substantially transparent areas where the opaque areas are substantially of the same optical density, the so-called line or halftone negative or positive). The image or transparency may or may not be in operative contact, e.g., contact exposure or projection exposure. It is possible to expose through paper or other light-transmitting materials. A stronger light source or longer exposure times must be used, however.

Reflex exposure techniques are especially useful in the present invention, particularly when office copies are made. By using reflex exposure, copies can be made from opaque supports, e.g., paper, cardboard, metal, etc., as well as from poor light-transmitting surfaces with no loss in speed, excellent resolution, and in addition, right-reading copies are obtained directly on transfer.

Since free-radical-generating addition-polymerization initiators activatable by actinic light generally exhibit their maximum sensitivity in the range of 300 to 500 mu, the light source should furnish an effective amount of this radiation. Such sources include carbon arcs, mercury-vapor arcs, fluorescent lamps with ultraviolet and shortwave-length visible light-emitting phosphors, argon glow lamps, electronic flash units and photographic flood lamps.

After the exposure of the photopolymerizable layer, the exposed composition is contacted with the receptor support while simultaneously heat is applied to effect the transfer of the underexposed areas of the photopolymerizable composition. While the heat is preferably applied simultaneously with the contact of the exposed element to the receptor support, the heat can be applied at any stage of the process prior to the separation step to either or both elements provided the transfer temperatures correspond to at least the softening temperature of the photopolymerizable stratum. Heat can be applied by means well known to the art, e.g., rollers, flat or curved heating surfaces or platens, radiant sources, e.g., heating lamps, etc.

The heating temperature can range from above 40° C. to about 220° C. and the contact time for 0.01 to 10 seconds. In general, about 0.1 second is adequate and shorter periods of contact are possible by using an intense radiant source of heat, e.g., infrared lamps or heat sources. Preferably the temperature range is 55° C. to 120° C.

The invention will be further illustrated by, but is not intended to be limited to, the following detailed examples.

*Example I*

A thermoplastic photopolymerizable composiiton was prepared by ball-milling for 2 hours 30 g. of a solution of polyethylene terephthalate/sebacate (50 mole percent) in methylene chloride (18% by weight solids), 5.4 g. of triethylene glycol diacrylate, 0.005 g. of a photoinitiator, anthraquinone, and 0.005 g. of a thermal inhibitor, p-methoxyphenol. To the photopolymerizable composition was added 0.2 g. of a red dye, 1,1'-diethyl-2,2'-cyanine iodide. The photopolymerizable solution containing the dye was coated to a depth of 10 mils on a 4-mil thick polyethylene terephthalate film support bearing a subcoat of a copolymer of vinylidene chloride/methyl acrylate/itaconic acid as a disclosed in Alles et al., U.S. Patent 2,627,088. The coating was dried and a 2-mil thick photopolymerizable layer resulted. The dry surface of said layer was brought into contact with a photographic positive transparency containing line and letter-text images and the film was exposed through the positive for 1 minute to a 275-watt, 60-cycle low-pressure, mercury-arc light source ("Hanovia" lamp) at a distance of 4 inches whereby photopolymerization took place in the areas of the layer which were exposed to light. The exposed layer was then brought into intimate contact with a sheet of white paper and the resulting sandwich was heated by means of a hot, flat heating element pressing against the reverse surface of the film support at a temperature of 100° C. for 3 seconds. While still warm, the two surfaces were stripped apart. The underexposed, dyed, thermoplastic, photopolymerizable material transferred from its original support to the paper forming a well defined, high contrast copy of the original image on the paper and leaving a reverse negative letter text, in relief, on the original support. At room temperature, the new image was non-tacky and firm. Multiple copies were obtained by repeating the thermal transfer process described above using new paper sheets.

*Example II*

A thermoplastic photopolymerizable composition prepared by mixing 8 g. of low viscosity polyvinyl acetate acrylate (containing a maximum of 10 mole percent acrylyl groups) in 10 ml. of methylene chloride, 1.6 g. triethylene glycol diacrylate, 0.002 g. of anthraquinone and 0.002 g. of p-methoxyphenol, and Fuchsine dye (CI 42510) dissolved in ethanol to impart a magenta color to the film (optical density of the coated support equals 0.9 at 565 m$\mu$), was coated on a 1-mil polyethylene terephthalate film. The dry surface of the photopolymerizable layer, 0.5-mil thick, was brought into contact with a photographic positive transparency containing line and lettertext images and then placed in a vacuum frame. The vacuum frame containing the photopolymerizable element was placed beneath an 1800-watt high-pressure mercury arc and was exposed for 4 seconds to 1.75 watts of actinic radiation per square inch. After removing the exposed element from the vacuum frame, it was brought into intimate contact for 0.5 second with a sheet of white paper which had been preheated to 85° C., and while warm the two supports were separated. The underexposed, dyed thermoplastic photopolymerizable material was transferred to the surface of the paper to provide a direct copy of the original lettertext positive. The quality was comparable to that described in Example I. At room temperature, the transferred image was non-tacky. By repeating the thermal transfer process, five times, satisfactory direct copies of the original image were obtained on five paper sheets.

*Example III*

A dyed, thermoplastic photopolymerizable composition as described in Example II, was coated on a polyethylene terephthalate film base support and exposed imagewise to actinic light by the procedures described in Example II. The exposed surface was brought into intimate contact with the surface of a clean aluminum sheet and the sandwich was passed between 2 rollers, one of which was heated to 85° C. The supports were immediately separated as they emerged from the rollers. The transferred image was post-exposed over its entire area to the actinic light source in a similar manner and a durable lithographic printing plate obtained. The transferred material was ink-receptive and hydrophobic, adherence to the aluminum support was excellent and after 500 copies of the image were reproduced using an offset copying machine (a "Multilith Duplicator" Model 1250, manufactured by the Addressograph-Multigraph corporation, Cleveland, Ohio) no sign of wear or degradation was apparent.

*Example IV*

A dyed, thermoplastic photopolymerizable composition, as described in Example II, was coated on a polyethylene terephthalate film base support and exposed imagewise to actinic light by the procedures described in Example II. The exposed surface was brought into intimate contact with a fine mesh screen of silk mounted on a wooden frame and supported by a firm aluminum sheet. The reverse side of the photopolymerizable composition support was heated to a temperature of 110° C. for 3 seconds and the warm supports separated, leaving the unexposed areas attached to the silk screen. The silk screen, after post-exposing for 3 seconds to the light source described in Example II, was used for printing, and well-defined, high-contrast copies of the original image were obtained.

*Example V*

A thermoplastic photopolymerizable composition was prepared from 12 g. of low viscosity polyvinyl acetate methacrylate (containing a maximum of 20 mole percent of methacrylyl groups), 12 ml. of ethanol, 2.54 g. of a polyethylene glycol diacrylate, 0.009 g. of anthraquinone and 0.009 g. of p-methoxyphenol. To a one-third portion of the photopolymerizable composition there was added 0.06 g. of a blue-green dye, Calcocid Green S (CI 44090), in 4 ml. of ethanol. Two similar compositions were prepared adding to one 0.06 g. of a magenta dye, Fuchsine (CI 42510), in 4 ml. of ethanol and to the other 0.06 g. of a yellow dye, Auramine Base (CI 41000B), in 4 ml. of ethanol. The resulting dye-containing photopolymerizable solutions were cast to a wet thickness of 1 mil on polyethylene terephthalate film supports described in Example II and the layers were allowed to dry in the dark. Firm, dry layers, 0.5-mil thick, were obtained. Each layer was exposed through a halftone, three color separation-positive type photographic image to 1.75 watts of actinic radiation per square inch for 10 seconds as described in Example II. The exposure was adjusted to provide adequate exposure for the layer containing the yellow dye (Auramine Base) since that dye did not have the desired absorption minimum at a wavelength which was actinic for the anthraquinone initiator. Thus, the exposure was substantially more than the minimum required for adequate exposure of the layer containing the magenta and blue-green dyes which did have absorption minima at a wavelength which was actinic for the initiator (as required by the claims of the invention). The exposed magenta colored photopolymerizable layer was brought into intimate contact with a sheet of white paper and subsequently passed through rollers, one of which was heated to 85° C. The time of contact was about one-half second. The underexposed area was transferred to the paper. In like manner, the blue-green and then the yellow unexposed areas of their respective photopolymerizable layers were transferred in register to the same paper sheet. A well-defined, high contrast, three color reproduction of the original image was formed on the paper sheet.

*Example VI*

A photopolymerizable composition was prepared as described in Example I and was coated on a 4-mil thick polyethylene terephthalate photographic film support to a dry thickness of 2 mils as described in Example I. On the light-sensitive surface was placed, first, a 1-mil thick polyethylene terephthalate layer and, second, a glossy, opaque, white paper with a black printed image, the image side being toward the photopolymerizable surface (the 1-mil thick polyethylene terephthalate film prevented dye in the photopolymerizable layer from staining the paper). The element was placed in a vacuum frame and exposed reflectographically for 54 seconds at a distance of 6 inches to actinic light from a 275-watt sunlamp through the back side of the polyethylene terephthalate photographic film support. The exposed photopolymerizable layer was brought into intimate contact with a sheet of white paper. The resulting sandwich was then heated through the reverse side of the film support by contact for 5 seconds with a flat iron which has been preheated to 140° C. and while still warm the supports were separated. The photopolymerizable material was transferred from the areas in contact with the printed image forming a right-reading copy of the original image in red print on the surface of the paper.

*Example VII*

A photopolymerizable composition was prepared as described in Example I and was coated on a 4-mil thick polyethylene terephthalate photographic film support to a dry thickness of 4 mils. The photopolymerizable layer was brought into intimate contact with an image-bearing photographic negative, the emulsion side being in contact with the photopolymerizable layer. The system was placed in a vacuum frame and exposed to 1.75 watts of actinic radiation per square inch for 2 seconds as described in Example II. The exposed film was removed from the vacuum frame, the layer was brought into intimate contact with a sheet of paper and the resulting sandwich was heated for 5 seconds through the film support by means of a flat surface preheated to 140° C. The underexposed areas of the photopolymerizable layer transferred to the paper support. The exposed areas of the photopolymerizable composition which did not transfer formed a positive relief image. The unexposed relief image, 4-mils thick, was post-exposed to actinic light for 2 seconds as described above. When the printing relief was used for printing in a rotary press, good copies were obtained.

*Example VIII*

A photopolymerizable composition was prepared by mixing 4 g. of low viscosity polyvinyl acetate methacrylate (containing a maximum of 20 mole percent of methacrylyl groups), 4 ml. of ethanol, 0.85 g. of a polyethylene glycol diacrylate (as described in Example V), 0.003 g. of anthraquinone and 0.003 g. of p-methoxyphenol. To the photopolymerizable composition there was added 0.06 g. of a blue-green dye, Calcocid Green S (CI 44090) in 4 ml. of ethanol and the resulting solution was cast to a wet thickness of 1 mil on a polyethylene terephthalate photographic film support. The solution was allowed to dry in the dark and a firm, dry layer, 0.5-mil thick was obtained. The layer was exposed to 1.75 watts of actinic radiation per square inch for 10 seconds through an image-bearing photographic positive in contact with the light-sensitive composition as described in Example II. The exposed photopolymerizable layer was brought into intimate contact with a sheet of paper while simultaneously heating the assemblage to 100° C. during the contact period of 0.5 second. The two warm contacting surfaces were separated and the underexposed areas of the photopolymerizable layer were transferred to the paper. The cooled, transferred surface was wet with an ethanol-water solution (40% by volume) and was brought into intimate contact with a sheet of white paper at room temperature. When the surfaces of the two sheets were separated, a blue-green image was obtained on the new paper sheet as the result of dye transfer. Multicopies were prepared by repeating the latter-described wet transfer procedure.

*Example IX*

A photopolymerizable composition containing a Fuchsine dye (CI 42510) was prepared, was coated on a polyethylene terephthalate film base support, and was exposed to actinic light as described in Example II. The underexposed areas of the photopolymerizable composition were transferred to a clean aluminum sheet by the procedure described in Example III and the transferred surface was post-exposed to 1.75 watts of actinic radiation per square inch for 4 seconds using the light source described in Example II. The printing element thus formed was etched for 15 minutes by a 3% by weight solution of HCl. A photoengraving printing plate resulted which was suitable for printing.

*Example X*

A dye-containing, photopolymerizable solution was prepared by mixing 6 g. of an acetone-cellulose acetate butyrate solution (20% by weight of solids) (the cellulose acetate butyrate contains 20% of acetyl groups, 26% butyryl groups and has a viscosity of 56 to 131 poises determined by A.S.T.M. method D–1343–54T in the solution described as Formula A, A.S.T.M. method D–871–54T), 0.8 g. of polyethylene glycol diacrylate (average molecular weight of the diol precursor being 300), 1.5 ml. of ethanol, and 10 mg. of Calcocid Green S dissolved in 2 ml. of ethanol and 5 ml. of acetone. The photopolymerizable solution was coated on a 1.5-mil thick polyethylene terephthalate film base to a dry layer thickness of 0.5 mil. The coated film was half-covered by a piece of black cardboard and was placed in a vacuum frame. The layer was exposed to 1.75 watts of actinic radiation per square inch for 22 seconds from an 1800 watt, high-pressure mercury-arc lamp. After removal from the vacuum frame, only the exposed surface of the photopolymerizable element was brought into intimate contact with a sheet of white paper and the resulting sandwich was heated at 147° C. for 7 seconds. (No thermal transfer occurred at temperatures below 147° C.) Upon separating the two surfaces, the exposed area of the photopolymerizable layer transferred to the paper. In like manner, the underexposed area of the photopolymerizable layer was brought into intimate contact with a paper support and the element formed was heated at 121° C. for 7 seconds. The underexposed area transferred to the paper support when the two surfaces were separated. This example illustrates that polymerization can occur in the absence of a photoinitiator and that the exposed area will not thermally transfer at the transfer temperature of the underexposed area, e.g., 121° C.

*Example XI*

A photopolymerizable solution was prepared by mixing 10 g. of an acetone solution containing 2.5 g. of cellulose acetate butyrate (the cellulose acetate butyrate contains 20.5% acetyl groups, 26% butyryl groups and has a viscosity of 9.0–13.5 poises determined by A.S.T.M. method D–1343–54T in the solution described as Formula A, A.S.T.M. method D–871–54T), 0.039 g. phenanthraquinone, 0.023 g. Calcocid Green S dye with a solution consisting of 8 cc. of acetone and 2.5 g. of polyethylene glycol diacrylate (average molecular weight of the diol precursor being 300). The solution was coated on 1-mil thick polyethylene terephthalate film base to a dry layer thickness of 1.4 mils. The coated film was brought into contact with a photographic positive type combined halftone and lettertext image transparency and the system was placed in a printing frame. The film surface was exposed through the glass of the printing frame and the photographic transparency for one minute at a distance of three inches to a 275-watt sunlamp having a 105-watt mercury arc output. The exposed photopolymerizable surface was brought into intimate contact with the surface of a paper sheet and the sandwich was heated between 2 rollers, one of which was heated to 155° C. The supports were immediately separated as they emerged from the rollers. A well defined, high contrast copy of the original image was formed on the paper support. Similar image reproductions were obtained by using either "Pyrex" glass or polyethylene terephthalate film base as the receptor support.

*Example XII*

A photopolymerizable solution was prepared by adding 10 g. of a methyl ethyl ketone solution containing 2.58 g. of "Vinylite" resin (consisting of approximately 90 percent by weight of vinyl chloride and 10 percent by weight of vinyl acetate and having a specific viscosity of 0.88–0.93 for 1 g. of resin per 100 cc. of solution in methyl isobutyl ketone at 20° C. and manufactured by Union Carbide Corp., New York), 0.031 g. of phenanthrenequinone and 0.009 g. of extra concentrated Calcocid Green S (CI 44090), 0.86 g. of polyethylene glycol diacrylate (average molecular weight of diol precursor is 300) containing 0.017 g. of phenanthrenequinone and 9 cc. of a 0.2 percent solution of anthraquinone in acetone. The solution was coated on 1-mil thick polyethylene terephthalate film base to a wet thickness of 13 mils and was allowed to dry. The dry surface was brought into contact with a photographic positive type combined halftone and lettertext image transparency and the system was placed in a printing frame. The film surface was exposed through the glass of the printing frame and the photographic transparency for one minute at a distance of four inches to a 275-watt sunlamp having a 105-watt mercury arc output. The exposed surface was then brought into intimate contact with a paper receptor as described in Example XI except that one of the rollers was heated to about 160° C. A copy of the original transparency was obtained on the new paper support when the surfaces were separated.

*Example XIII*

A photopolymerizable solution was prepared containing 1 g. of cellulose acetate butyrate (containing 37% butyryl groups, 13% acetyl groups, 2% hydroxyl groups and having a viscosity of 64 to 124 poises determined by the method described in Example XI), 1.0 g. polyethylene glycol diacrylate as described in Example XI, 0.01 g. Calcocid Green S dye extra concentrated, 0.008 g. of phenanthrenequinone and acetone to bring the weight to 20 g. The solution was coated on a 1.5-mil thick polyethylene terephthalate film base to a dry layer thickness of 0.4 mil. The dried thermoplastic photopolymerizable coating on the film base was brought into contact with the black printed image surface of a glossy, opaque white paper; the system was placed in a vacuum frame and was exposed for 2 seconds to a 275-watt General Electric Type RS sunlamp at a distance of 10 inches from the vacuum frame. The exposed surface of the photopolymerizable coated film was brought into contact with a paper receptor as described in Example XI except that one of the rollers was heated to 130° C. The pressure of the rolls exerted a force of 2.5 pounds per inch. A copy of the original image was obtained on the new paper support when the surfaces were separated.

*Example XIV*

A photopolymerizable solution was prepared containing 0.56 g. of cellulose acetate butyrate (as described in Example XIII), 0.45 g. of cellulose acetate having 39.4% acetyl groups and having an A.S.T.M. viscosity of 45, 2.5 g. of pentaerythritol tetraacrylate, 0.67 g. of a solution prepared by dissolving 12.5 g. of a polyethylene glycol (having an average molecular weight of 4000) in 100 g. of methanol, 0.056 g. of "Pontacyl" Wool BL dye (CI 50315), 0.03 g. phenanthrenequinone, 2.4 g. methanol, 2.2 g. methyl ethyl ketone and acetone to bring the weight to 20 g. The solution was coated, dried, exposed and imagewise transferred to a paper receptor sheet as described in Example XIII, giving a clear blue copy of the original image.

*Example XV*

A photopolymerizable composition was made according to Example XIV but instead of coating it onto polyethylene terephthalate film base the coating solution was coated onto a thin, flexible, glassine paper having an average specular transmission of 63% and a weight of 24 lbs. per ream (500) of 2- by 3-foot sheets. The dried sheets were exposed and transferred, imagewise, to a paper receptor sheet as described in Example XIV, giving a clear blue copy of the original image.

The processes of the parent application are useful for a variety of copying, printing, decorative and manufacturing applications. Pigments, e.g., $TiO_2$ colloidal carbon, metal powders, phosphors, etc., and dyes which do not appreciably absorb light at the wavelength being used for exposure or inhibit polymerization can be incorporated in the light-sensitive photopolymerizable layer, and by use of the instant process, images can be transferred to a receptor support. Multicopies of the process images can be obtained from the transferred image. The number of copies prepared is dependent on the photopolymerizable composition thickness as well as the process conditions. The process is also useful for preparing multicolor reproductions. Colorless constituents which form colored compounds when heat is applied or brought into contact with other color-forming components are useful in the instant transfer process. Reflex exposures can be used for any of these applications provided the support is transparent or translucent, and is especially useful in copying from poor or non-light-transmitting supports, e.g., paper, cardboard, etc.

Lithographic surfaces can be produced by thermally transferring a hydrophobic layer to a hydrophilic receptor surface or vice versa. The images on the lithographic surface can be made impervious to chemical or solvent attack by post-exposing the ltihographic surface. Alternatively, the exposed areas of the photopolymerizable composition, after the underexposed areas are transferred, can be used as a lithographic-offset printing plate if they are hydrophobic and the original sheet support is hydrophilic or vice versa. Silk screens can also be made by this process.

The transferred images are not only useful for making copies of the original image transparency by dry methods as indicated above but after transfer of the unexposed areas to a receptor support the thermoplastic surface can be treated with e.g., aqueous solutions, dyes, inks, etc. to form colored images. Colored copies of the original image can be obtianed when the wet surface is brought into intimate contact with a receptor support and the surfaces separated (see Example VIII). Solvents which are used for the spirit copying, e.g., ethanol, or water, should meter out the dye used and be a non-solvent for the polymer. The solubility of the dye and binder are important factors in selecting the solvent. The process is also useful because it permits the rapid examination of the printing qualities, e.g., of separation negatives and positives, under conditions simulating true printing.

The instant elements have the advantage that by a simple procedure, involving the use of light and heat in a dry system, copies of images which are of high quality and stability are obtained rapidly. The elements are very versatile, i.e., they are useful in copying, e.g., multicopying, printing, silk screen processes and in color reproduction, including multicolor reproduction. Both line and halftone images can be transferred simultaneously. Still further advantages will be apparent to those skilled in the art of image formation.

We claim:

1. A photopolymerizable element comprising a support bearing a thermoplastic photopolymerizable stratum, said stratum being solid below 40° C., thermally transferable by having a stick or transfer temperature above 18° C. and below 220° C. and comprising:

(a) an ethylenically unsaturated compound containing at least one terminal $CH_2{=}C{<}$ group, having a boiling point above 100° C. at normal atmospheric pressure and being capable of forming a high polymer by photo-initiated addition polymerization, (b) a free radical generating addition polymerization initiator activatable by actinic light in the visible region of the spectrum and inactive thermally below 85° C., and (c) a coloring material for said stratum which is stable to light during an imagewise exposure of the stratum, thermally stable at 18° C.–220° C., during a thermal transfer of the underexposed areas of the stratum, absorbs radiation in a region of the visible spectrum and imparts an optical density of at least 0.5 in said region, and imparts an optical density less than 0.3 and transmits appreciable actinic radiation in another region where said initiator is activatable to promote polymerization.

2. An element according to claim 1 wherein component (c) is a dye.

3. An element according to claim 1 which contains in addition to coloring material (c) a color-forming material.

4. An element according to claim 1 wherein component (c) is a dye which is non-reducible by light at 18° C.–220° C. during imagewise exposure, and at wavelengths between 350 and 500 mu there is a coincidence of activation of the initiator and absorption minimum of the dye.

5. An element according to claim 1 containing (d) a thermoplastic organic compound solid at 50° C.

6. An element according to claim 1 containing (d) a thermoplastic organic polymer solid at 50° C. and wherein component (a) has a plasticizing action on said polymer.

7. An element according to claim 1 containing (d) a thermoplastic organic compound solid at 50° C., and at least one of the following components:

(e) an addition polymerization inhibitor, and (f) at least one chain transfer agent.

8. An element according to claim 1 wherein said stratum has a thickness from 0.01 to 1.0 mil.

9. An element according to claim 1 wherein said support is thin and translucent-to-transparent to visible light.

10. An element according to claim 1 wherein said support is a thin, flexible, transparent polymeric film.

11. An element according to claim 1 wherein said support is a thin, flexible, transparent polyethylene terephthalate film.

12. An element according to claim 1 wherein said support is a thin, flexible, visible light-transmitting paper.

13. An element according to claim 1 wherein component (b) is phenanthrenequinone.

14. A photopolymerizable element comprising a thin, flexible, transparent support bearing on one surface a photopolymerizable stratum having a thickness from 0.01 to 1.0 mil comprising (a) pentaerythritol tetraacrylate, (b) phenanthrenequinone, (c) a dye which is stable to light during an imagewise exposure of the stratum, thermally stable at 18° C.–220° C. during a thermal transfer of the underexposed areas of the stratum, absorbs radiation in a region of the visible spectrum and imparts an optical density of at least 0.5 in said region, and imparts an optical density of less than 0.3 and transmits appreciable actinic radiation in another region where said initiator is activatable to promote polymerization, and (d) a mixture of cellulose acetate butyrate, cellulose acetate and polyethylene glycol of molecular weight of 500 to 20,000.

15. A photopolymerizable element comprising a thin, flexible, translucent-to-transparent paper bearing a photopolymerizable stratum having a thickness from 0.01 to 1.0 mil comprising:

(a) pentaerythritol tetraacrylate, (b) phenanthrenequinone, (c) a dye which is stable to light during an imagewise exposure of the stratum, thermally stable at 18° C.–220° C. during a thermal transfer of the underexposed areas of the stratum, absorbs radiation in a region of the visible spectrum and imparts an optical density of at least 0.5 in said region, and imparts an optical density of less than 0.3 and transmits appreciable actinic radiation in another region where said initiator is activatable to promote polymerization, and (d) a mixture of cellulose acetate butyrate, cellulose acetate and polyethylene glycol of molecular weight of 500 to 20,000.

References Cited by the Examiner

UNITED STATES PATENTS

| | | | |
|---|---|---|---|
| 2,480,749 | 8/1949 | Marks. | |
| 2,875,047 | 2/1959 | Oster. | |
| 2,993,789 | 7/1961 | Crawford | 96—115 |
| 2,997,391 | 8/1961 | Murray et al. | 96—115 |
| 3,038,800 | 6/1962 | Luckey et al. | 260—895 |
| 3,050,390 | 8/1962 | Levinos. | |
| 3,060,023 | 10/1962 | Burg et al. | 96—28 |
| 3,097,096 | 7/1963 | Oster | 96—30 |
| 3,099,558 | 7/1963 | Levinos. | |

FOREIGN PATENTS

| | | |
|---|---|---|
| 570,883 | 3/1959 | Belgium. |

NORMAN G. TORCHIN, *Primary Examiner.*